(12) United States Patent
Schutzman et al.

(10) Patent No.: US 12,522,111 B2
(45) Date of Patent: Jan. 13, 2026

(54) LATCHES AND LATCH SYSTEMS FOR VEHICLE SEATS AND VEHICLE SEATS

(71) Applicant: Toyota Motor Engineering & Manufacturing North America, Inc., Plano, TX (US)

(72) Inventors: Nicholas J. Schutzman, Canton, MI (US); Vikas Bhatia, South Lyon, MI (US); Yi-Ru C. Sosnowski, Ann Arbor, MI (US)

(73) Assignees: Toyota motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 398 days.

(21) Appl. No.: 18/164,854

(22) Filed: Feb. 6, 2023

(65) Prior Publication Data
US 2024/0262259 A1     Aug. 8, 2024

(51) Int. Cl.
*B60N 2/015*     (2006.01)
*B60N 2/90*      (2018.01)

(52) U.S. Cl.
CPC .... *B60N 2/01541* (2013.01); *B60N 2002/952* (2018.02)

(58) Field of Classification Search
CPC ............ B60N 2/01541; B60N 2/01583; B60N 2/366; B60N 2002/952
See application file for complete search history.

(56) References Cited

U.S. PATENT DOCUMENTS

| | | | |
|---|---|---|---|
| 6,152,515 A * | 11/2000 | Wieclawski | B60N 2/01583 296/65.03 |
| 7,500,707 B2 | 3/2009 | Lutzka et al. | |
| 7,914,062 B2 | 3/2011 | Iwasa et al. | |
| 7,959,205 B2 * | 6/2011 | Paing | B60N 2/01583 296/65.03 |
| 8,251,430 B2 | 8/2012 | Ishii et al. | |
| 8,282,141 B2 | 10/2012 | Paing et al. | |
| 8,360,497 B2 | 1/2013 | Kokubo et al. | |

FOREIGN PATENT DOCUMENTS

JP     2001001799 A     1/2001

* cited by examiner

*Primary Examiner* — Milton Nelson, Jr.
(74) *Attorney, Agent, or Firm* — Dinsmore & Shohl LLP

(57) ABSTRACT

A latch for a vehicle seat includes a latch body and a bracket having a plate defining a pivot point and a slot is provided. The latch body is pivotably coupled to the bracket at the pivot point and movably coupled to the bracket at the slot such that the latch body pivots about the pivot point between a latched position and a variation absorbing position. The latch body has a supporting shaft slidably supported by the plate at the slot. A biasing assembly is disposed between the pivot point and the supporting shaft and biasing the latch body toward the latched position.

9 Claims, 6 Drawing Sheets

LATCHES AND LATCH SYSTEMS FOR VEHICLE SEATS AND VEHICLE SEATS

TECHNICAL FIELD

The present specification generally relates to latches and latch systems for a vehicle seats and vehicle seats having latches.

BACKGROUND

Vehicles have vehicle seats for passengers and drivers. A vehicle seat may include a seat frame coupled to another portion of the vehicle, such as a vehicle frame. Latches are often used for secure the vehicle seat to the vehicle frame. Various types of latches are available for installation.

SUMMARY

In one embodiment, a latch for a vehicle seat includes a bracket having a plate defining a pivot point and a slot. A latch body pivotably coupled to the bracket at the pivot point and movably coupled to the bracket at the slot such that the latch body pivots about the pivot point between a latched position and a variation absorbing position. The latch body has a supporting shaft slidably supported by the plate at the slot. A biasing assembly is disposed between the pivot point and the supporting shaft and biasing the latch body toward the latched position.

In another embodiment, a latch system for a vehicle seat includes a latch. The latch comprises a bracket having a plate defining a pivot point and a slot. A latch body is pivotably coupled to the bracket at the pivot point and movably coupled to the bracket at the slot such that the latch body pivots about the pivot point between a latched position and a variation absorbing position. The latch body has a supporting shaft slidably supported by the plate at the slot. A biasing assembly is disposed between the pivot point and the supporting shaft and biasing the latch body toward the latched position. A striker is configured to engage with the latch.

In another embodiment, a vehicle seat including a seat frame, a first latch, and a second latch is provided. The first latch is coupled to the seat frame and includes a bracket having a plate defining a pivot point and a slot, a latch body pivotably coupled to the bracket at the pivot point and movably coupled to the bracket at the slot such that the latch body pivots about the pivot point between a latched position and a variation absorbing position, and the latch body having a supporting shaft slidably supported by the plate at the slot. A biasing assembly is disposed between the pivot point and the supporting shaft and biasing the latch body toward the latched position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure relates to a latch for a vehicle seat that can be used to facilitate installation of the vehicle seat to a vehicle (e.g., a vehicle frame or the like). As will be described in greater detail herein, the latch allows for pivotal movement of one latch on the object the latch is coupled to in order for a user to easily install another latch on the vehicle seat, and to account for small variations in alignment between the latches and the object to which the latches are coupled.

In embodiments, the latch includes a bracket having a plate defining a pivot point and a slot, as well as a latch body having a supporting shaft. The latch body pivots around the pivot point while the supporting shaft moves along the slot. The latch further includes a biasing assembly that biases the latch body toward a latched position. In other words, the biasing assembly biases the latch body in a direction away from the bracket. For example, the latched position may be the lowermost position where the latch body is positioned farthest from a center portion of the bracket. When the latch body receives an external force, the latch body may move in a direction toward the bracket and the biasing assembly may absorb some of the external force. The latch may be used with other latches coupled to a seat frame. In such case, the latch may absorb variations in alignment between the latches and a vehicle (e.g., a vehicle frame or the like) to which the latches are coupled.

Figure 1:
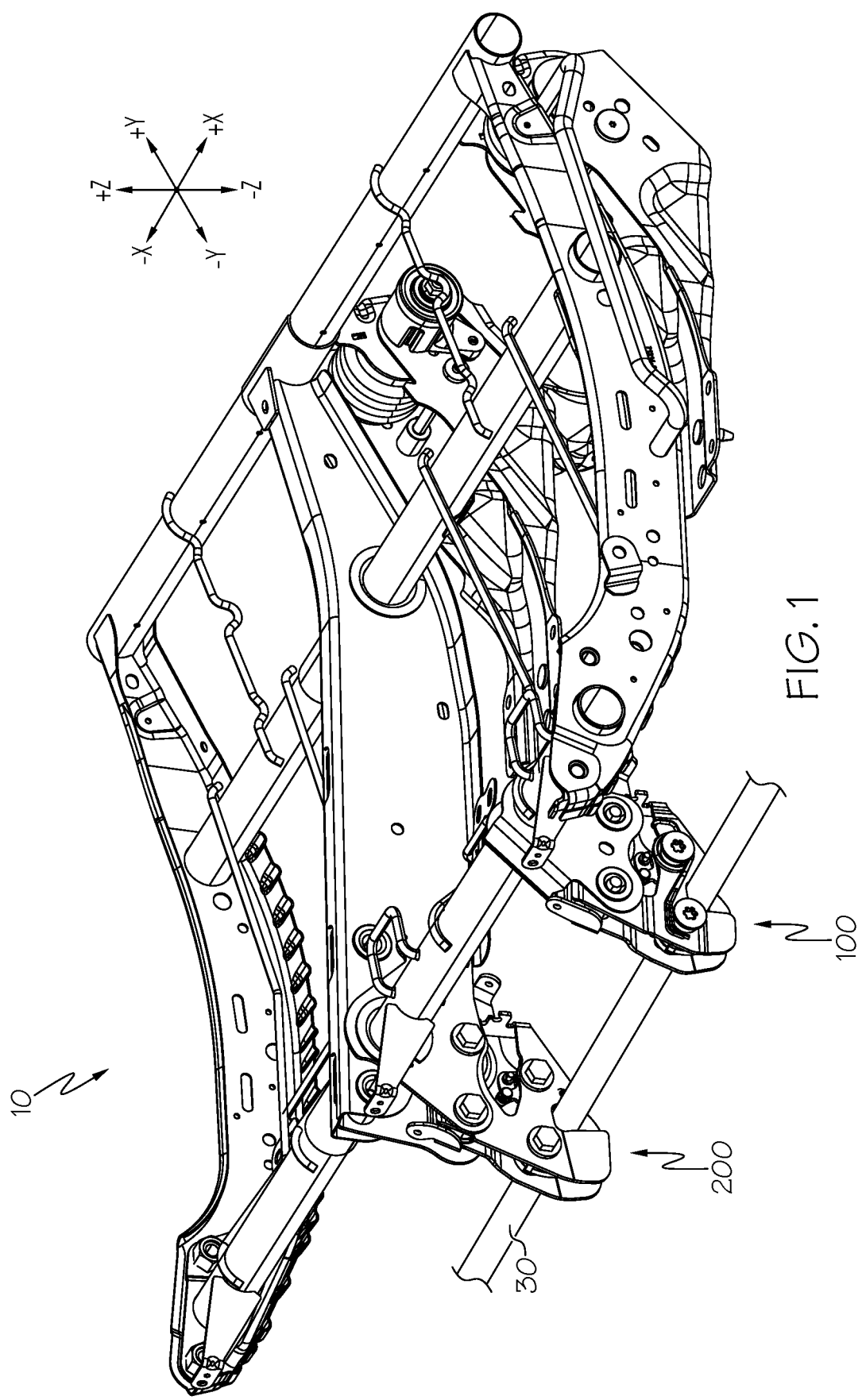
FIG. 1 schematically depicts a perspective view of a seat frame of a vehicle including an illustrative latch system according to one or more embodiments shown and described herein.

As used herein, the term "vehicle lateral direction" refers to the cross-vehicle direction of the vehicle (e.g., in the +/−X-direction as depicted in FIG. 1), the term "vehicle longitudinal direction" refers to the forward-rearward direction of the vehicle (e.g., in the +/−Y-direction as depicted in FIG. 1) and is transverse to the vehicle lateral direction. The term "vehicle vertical direction" refers to the upward-downward direction of the vehicle (e.g., in the +/−Z-direction as depicted in FIG. 1).

Referring now to FIG. 1, a seat frame 10 is generally depicted. In embodiments, the seat frame 10 maybe provided for a vehicle (e.g., a truck, a sport utility vehicle, a van, a boat, a plane, or other vehicle types). The vehicle may include a compartment in which the seat frame 10 is positioned therein for seating occupants within the vehicle. It should be understood that the vehicle may include any number of the seat frames 10 in embodiments. The seat frame 10 may further include power components for automatically adjust the position and/or temperature adjustment components for heating or cooling a vehicle seat. The seat frame 10 may be coupled to a vehicle frame 30.

The seat frame 10 includes one or more latches (e.g., a latch 100, a latch 200). In embodiments, at least one of the latch 100 and the latch 200 may have a variation absorbing function. In embodiments, a latch having a variation absorbing function is disposed on an outboard side (e.g., +X direction side of the vehicle), which is closer to a door of the vehicle. For example, the latch 100 has the variation absorbing function, and the latch 200 may or may not have the variation absorbing function. In embodiments, a latch having a variation absorbing function is disposed on an inboard side (e.g., −X direction side of the vehicle), which is away from the door of the vehicle. For example, the latch 200 has the variation absorbing function, and the latch 100 may or may not have the variation absorbing function.

In embodiments, the latch 100 and the latch 200 may be integrated with the seat frame 10 or coupled to the seat frame 10 by one or more coupling components. The latch 100 and the latch 200 may be disposed on a reward side of the vehicle (e.g., −Y direction side of the vehicle). In embodiments, the latch 100 and/or the latch 200 may be disposed on any position of the seat frame 10. For example, the latch 100 and/or the latch 200 may be disposed all four corners of the seat frame 10, on inboard sides of the seat frame 10, and/or the like. The latch 100 and the latch 200 may latch to the vehicle frame 30 to couple the seat frame 10 to the vehicle. It should be understood that cushions and other components of the vehicle seat may be disposed on the seat frame 10.

Figure 2A:
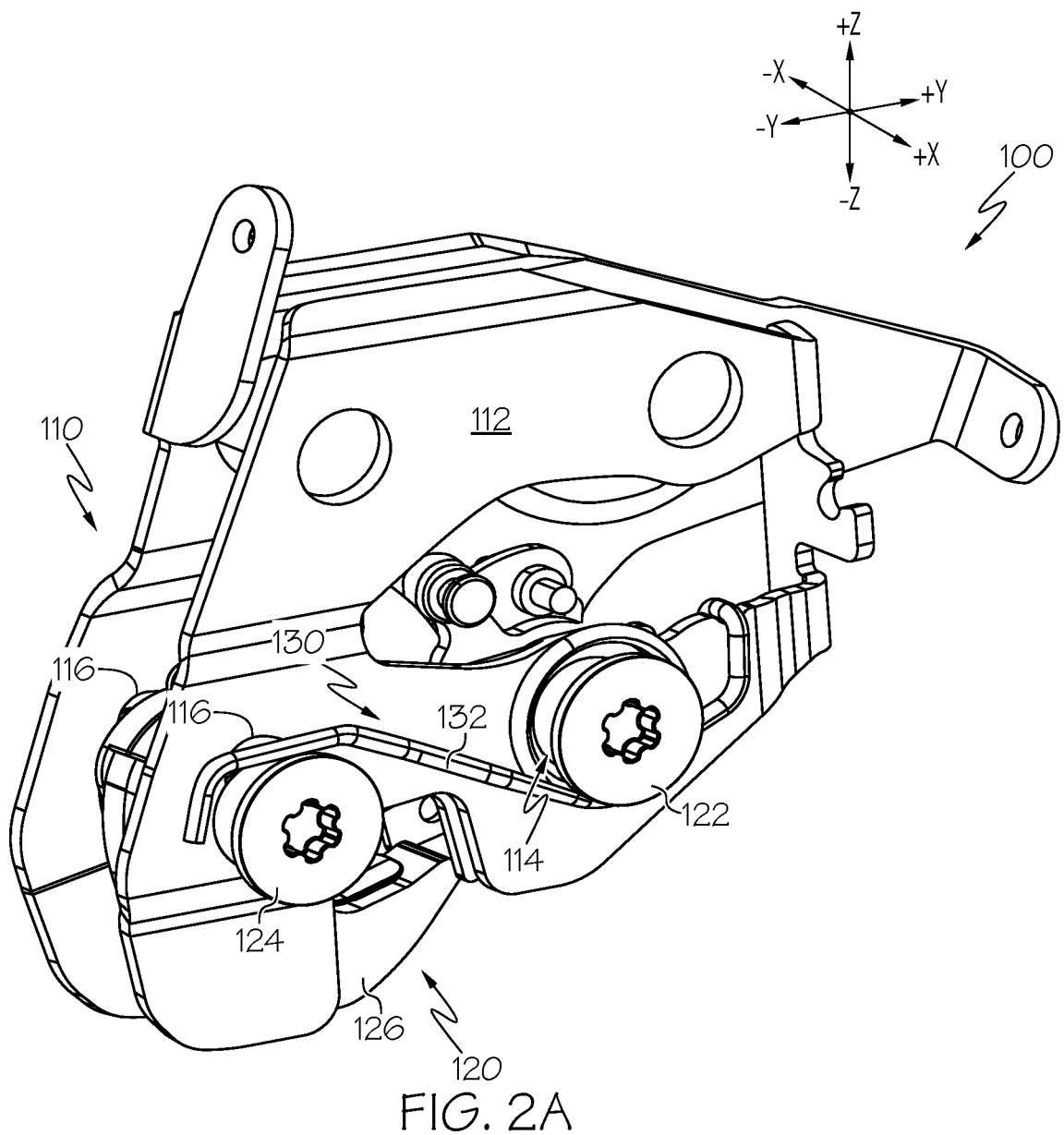
FIG. 2A schematically depicts a perspective view of an illustrative latch of the latch system of FIG. 1 according to one or more embodiments shown and described herein.

Referring to FIG. 2A, the latch 100 having the variation absorbing function is illustrated. The latch 100 includes a bracket 110, a latch body 120, and a biasing assembly 130. The bracket 110 has a plate 112. In embodiments, the plate 112 may include one or more plates or may be a single plate. The latch body 120 may be disposed in a space surrounded by the plate 112 such that the latch body 120 is at least partially covered by the plate 112.

The plate 112 defines a pivot point 114 and a slot 116. In embodiments, the pivot point 114 may be an opening or a cutout configured to receive a shaft (e.g., a pin, a rivet, a tube, or the like). In embodiments, the pivot point 114 may include a shaft portion, which a portion of the plate 112 is extended or deformed to form the shaft portion. In embodiments, the slot 116 may have an elongated shape. For example, the slot may be extended in the upward-downward direction of the vehicle (e.g., +/−Z-direction of the coordinate axes depicted in FIG. 2A). In embodiments, the slot may be extended in a latching direction, which is a direction the latch is moved to latch with the shaft. In other words, the latching direction may or may not deviate from the upward-downward direction of the vehicle or the same as the upward-downward direction. For example, the latch may be designed to move in a fore-aft direction to latch to absorb variation in the fore-aft direction.

The latch body 120 is pivotably coupled to the bracket 110 (e.g., the plate 112) at the pivot point 114. In embodiments, the latch body 120 may have a pivot shaft 122, which is supported at the pivot point 114. In embodiments, the pivot point 114 may pivotably support the latch body 120 at the shaft portion of the pivot point 114.

The latch body 120 is movably coupled to the bracket 110 (e.g., the plate 112) at the slot 116. The latch body 120 has a supporting shaft 124 slidably supported by the plate 112 at the slot 116. In embodiments, the supporting shaft 124 may slide along the slot 116. For example, the supporting shaft 123 may slide the upward-downward direction of the vehicle (e.g., +/−Z-direction of the coordinate axes of FIG. 2A) along the slot 116. In embodiments, the supporting shaft 123 may slide the latching direction.

Figure 3A:
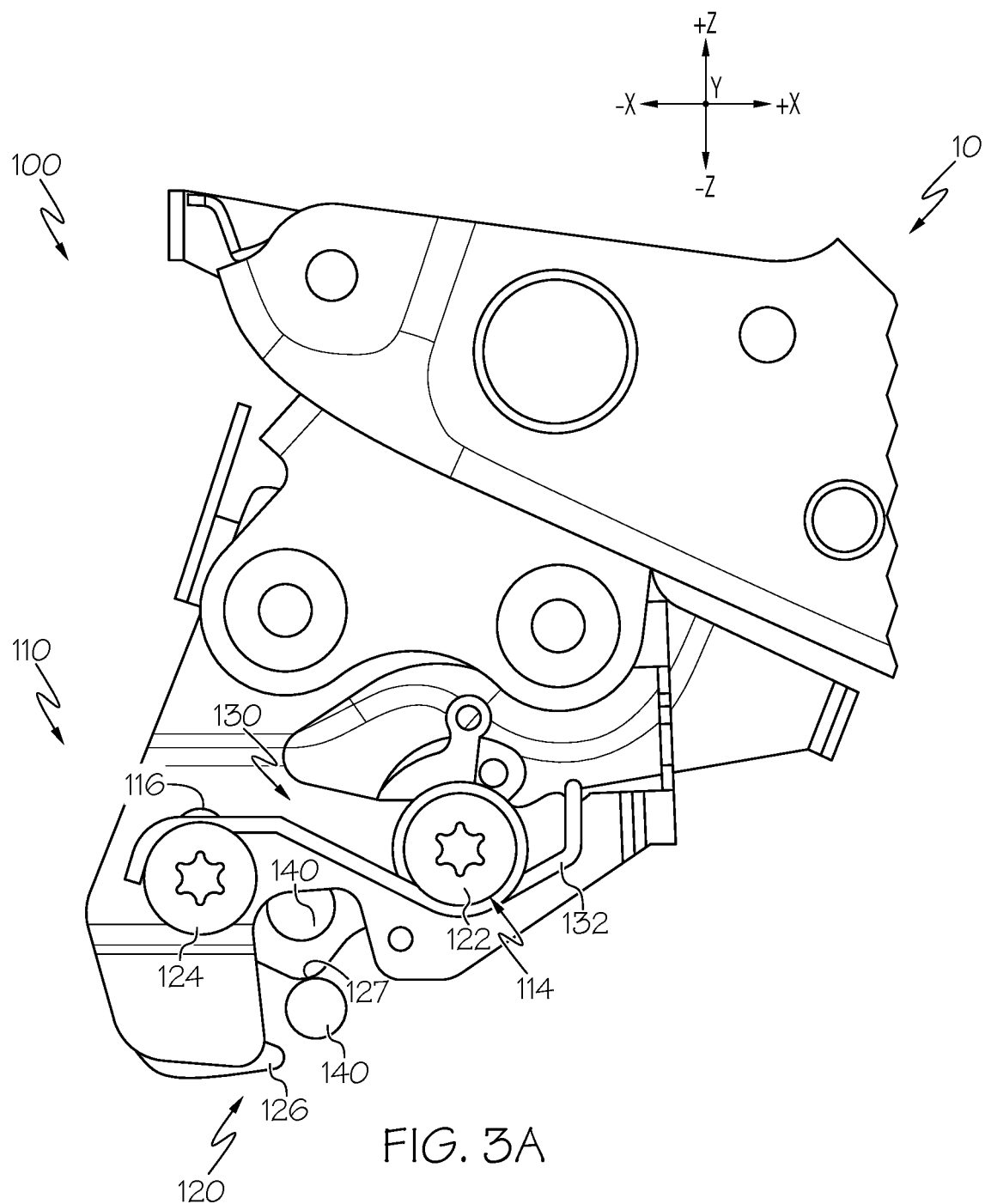
FIG. 3A schematically depicts a side view of the latch of FIG. 2A, where the latch body is in a latched position such that an engagement component is not engaged with a striker according to one or more embodiments shown and described herein.
Figure 3B:
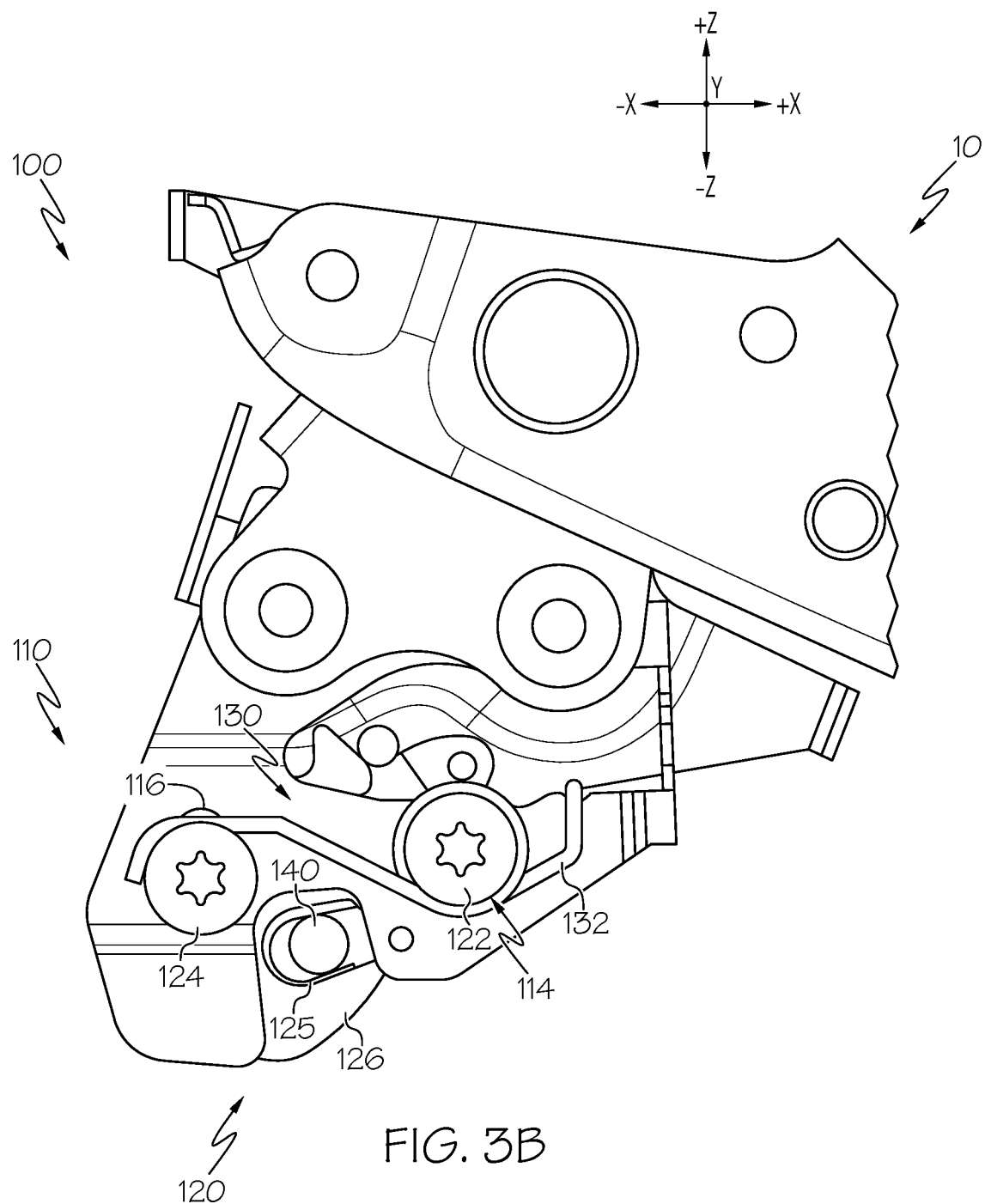
FIG. 3B schematically depicts a side view of the latch of FIG. 2A, where the latch body is in the latched position such that the engagement component is engaged with a striker according to one or more embodiments shown and described herein.

The biasing assembly 130 is disposed between the pivot point 114 and the supporting shaft 124 and biases the latch body 120 toward a latched position (FIGS. 3A and 3B). In embodiments, the biasing assembly 130 includes a spring 132, which is supported by the pivot point 114 and the supporting shaft 124. In embodiments, the spring 132 may be a torsion spring. For example, one end of the spring 132 is hooked on the plate 112 and a helical portion of the spring 132 is disposed around the pivot point 114. The other end of the spring 132 further extends toward the supporting shaft 124 such that a portion of the spring 132 disposed on the supporting shaft 124. The spring 132 may be wound in a certain direction to bias the supporting shaft 124 in a direction away from the bracket 110. For example, the spring force is directed toward the downward direction of the vehicle (e.g., in the −Z-direction of the coordinate axes of FIGS. 3A-3C). In embodiments, the spring 132 may be a leaf spring or other types of springs supported by the pivot point 114 and the supporting shaft 124 and similarly bias the supporting shaft 124 in the direction away from the bracket 110 (e.g., the downward direction of the vehicle (e.g., in the −Z-direction of the coordinate axes of FIGS. 3A-3C)).

Figure 2B:
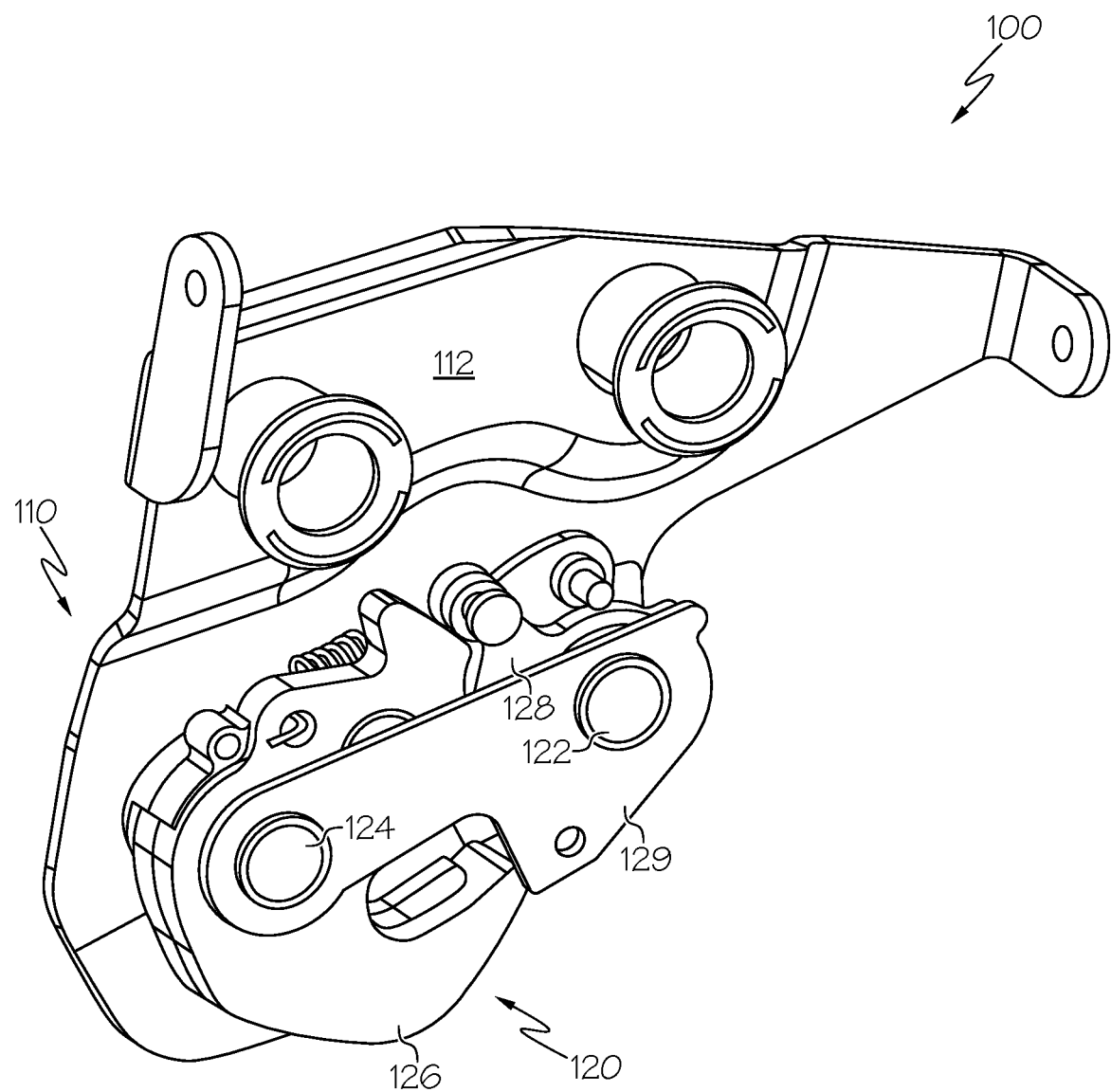
FIG. 2B schematically depicts a perspective view of a latch body of the latch of FIG. 2A by omitting a portion of a bracket to reveal the latch body according to one or more embodiments shown and described herein.

Referring to FIG. 2B, a perspective view of the latch body 120 of the latch 100 of FIG. 2A is shown. A portion of the bracket 110, more specifically, a portion of the plate 112 is omitted to reveal the latch body 120 hidden thereunder. In embodiments, the latch body 120 may include a retention finger 126 rotatably coupled to the supporting shaft 124. For example, the retention finger 126 may rotate around the supporting shaft 124 in a clockwise direction and in a counterclockwise direction. In embodiments, the retention finger 126 may be configured to engage with a striker 140 (FIG. 3A). For example, the striker 140 may be a portion of the vehicle frame 30 (FIG. 1). In embodiments, the latch body 120 may include a cam plate 128. The cam plate 128 may rotate to lock the latch body 120 with a locking mechanism of the latch body 120.

In embodiments, the pivot shaft 122 and the supporting shaft 124 may be supported by a plate 129. It should be understood that the latch body 120 pivots around the pivot shaft 122 and the retention finger 126 rotates around the supporting shaft 124. Therefore, the retention finger 126 pivots with respect to the pivot shaft 122 as well when the latch body 120 pivots around the pivot shaft 122.

Figure 3C:
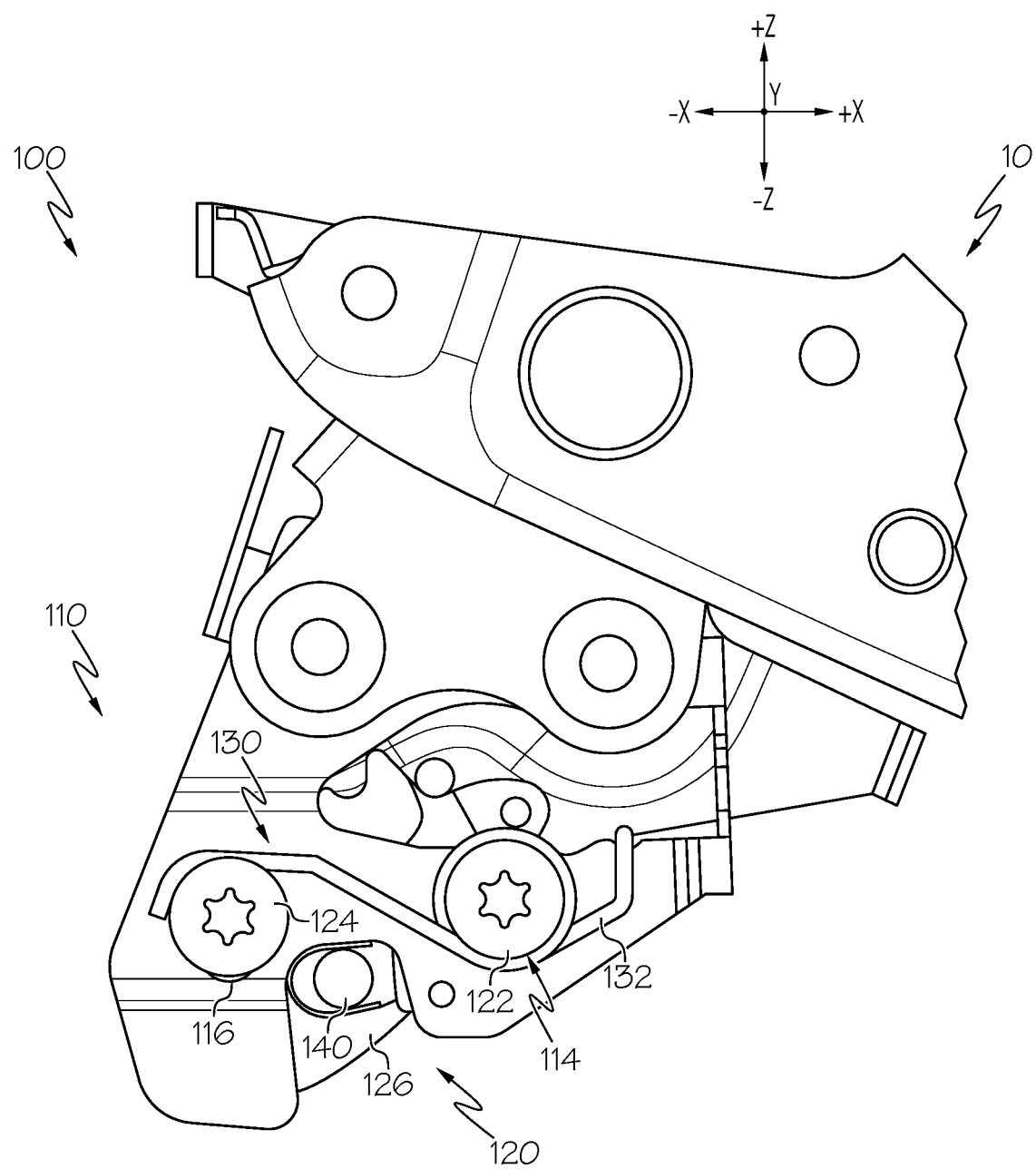
FIG. 3C schematically depicts a side view of the latch of FIG. 2A, where the latch body is in a variation absorbing position according to one or more embodiments shown and described herein.

Referring to FIGS. 3A-3C, the latch body 120 moves between the latched position and a variation absorbing position.

Referring to FIG. 3A, the latch body 120 is in the latched position and the retention finger 126 is not yet engaged with the striker 140. In embodiments, the striker 140 may be a portion of the vehicle frame. In the latched position, the latch body 120 is in its lowermost position with respect to the bracket 110. For example, the latch body 120 is in the lowermost position in the upward-downward direction of the vehicle (e.g., in the +/−Z-direction of the coordinate axes of FIG. 3A). The biasing assembly 130 may bias the latch body 120 in the downward direction of the vehicle (e.g., −Z direction) such that the latch body 120 stays in the lowermost position unless force is applied to push the latch body 120 in the upward direction of the vehicle (e.g., +Z direction). In embodiments, a lower surface of the supporting shaft 124 may contact a lower portion of the slot 116.

In FIG. 3A, the retention finger 126 comes into contact with the striker 140. In embodiments, a contacting surface 127 of the retention finger 126 contact the striker 140, and the striker 140 pushes the contacting surface 127 such that to rotate the retention finger 126 around the supporting shaft 124. For example, when the seat frame 10 is pushed in the downward direction of the vehicle (e.g., −Z-direction of the coordinate axes of FIG. 3A), the striker 140 contacts the contacting surface 127 and then rotates the retention finger 126 in the counterclockwise direction around the supporting shaft 124 when the seat frame 10 is further pushed down.

In embodiments, the latch body 120 may not move when the retention finger 126 is being rotated by the striker 140. For example, the retention finger 126 rotates when the latch body 120 stays in the latched position.

Referring to FIG. 3B, the latch body 120 is in the latched position and the retention finger 126 is engaged with the striker 140. In the latched position, the latch body 120 is in the lowermost position with respect to the bracket 110. Therefore, the latch body 120 is in the same position in FIGS. 3A and 3B. In FIG. 3B, the retention finger 126 is being engaged with the striker 140. The striker 140 is surrounded by a hook portion 125 of the retention finger 126 when being engaged with the retention finger 126.

In embodiments, when the retention finger 126 rotates in a counterclockwise direction around the supporting shaft 124, the cam plate 128 (FIG. 2B) turns in a clockwise direction around the pivot shaft 122. The retention finger 126 and the cam plate 128 may push each other to lock the retention finger 126 in a locked position as shown in FIG. 3B. The retention finger 126 may be released from locked state when the cam plate 128 is rotated in a counterclockwise direction around the pivot shaft 122 and the retention finger 126 is rotated in a clockwise direction around the supporting shaft 124. Alternatively, the retention finger 126 may be released from locked state when the cam plate 128 is rotated in a clockwise direction around the pivot shaft 122 and the retention finger 126 is rotated in a counterclockwise direction around the supporting shaft 124. It should be understood that the latch body 120 may include one or more components including a spring or an additional plate to configure the above explained locking mechanism of the latch body 120.

Similar to FIG. 3A, the biasing assembly 130 may bias the latch body 120 in the downward direction of the vehicle (e.g., −Z direction of the coordinate axes of FIG. 3B) such that the latch body 120 stays in the lowermost position while the retention finger 126 is being engaged with the striker 140.

Referring to FIG. 3C, the latch body 120 is in the variation absorbing position. When in the variation absorbing position, the latch body 120 is moved upward direction of the vehicle (e.g., +Z-direction of the coordinate axes of FIG. 3C) compared to the lowermost position of the latch body 120. In other words, when in the variation absorbing position, the latch body 120 is not in the lowermost position with respect to the bracket 110. In embodiments, the latch body 120 may be moved upward than the lowermost position or moved all the way up to the uppermost position with respect to the bracket 110 depending on how much force is applied to the latch 100. For example, the supporting shaft 124 may not contact the lower portion and an upper portion of the slot 160. For another example, the supporting shaft 124 may contact the upper portion of the slot 160 at the uppermost position.

In embodiments, the latch body 120 moves to the variation absorbing position when force is applied more than enough to engage the retention finger 126 with the striker 140. For example, when force is applied to push the seat frame 10 in the downward direction of the vehicle (e.g., −Z-direction of the coordinate axes of FIG. 3C) the striker 140 pushes the retention finger 126 in the upward direction of the vehicle (e.g., +Z-direction of the coordinate axes of FIG. 3C). After engaging with the retention finger 126, the retention finger 126 does not rotate further around the supporting shaft 124. When the force is applied further so that the striker 140 further pushes the retention finger 126 in the upward direction of the vehicle (e.g., +Z-direction of the coordinate axes of FIG. 3C), the latch body 120 is pushed in the upward direction in the upward direction of the vehicle (e.g., +Z-direction of the coordinate axes of FIG. 3C). As a result, the latch body 120 pivots around the pivot point 114 and the supporting shaft 124 moves in the upward direction along the slot 116.

In embodiments, the length of the slot 116 in the upward-downward direction of the vehicle (e.g., +/−Z-direction of the coordinate axes of FIG. 3C) may be adjusted based on the amount of variation to be absorbed. In embodiments, the spring force of the spring 132 may be adjusted based on the amount of variation to be absorbed.

It should now be understood that a latch for a vehicle seat in the present disclosure can be used to facilitate installation of the vehicle seat to a vehicle (e.g., a vehicle frame or the like). The latch allows for pivotal movement of one latch on the object the latch is coupled to in order for a user to easily install another latch on the vehicle seat, and to account for small variations in alignment between the latches and the object to which the latches are coupled. The pivotal movement is provided by the latch including a bracket having a plate defining a pivot point and a slot, as well as a latch body having a supporting shaft. The latch body pivots around the pivot point while the supporting shaft moves along the slot. The latch further includes a biasing assembly that biases the latch body in a direction away from the bracket. For example, the latched position may be the lowermost position where the latch body is positioned farthest from a center portion of the bracket. When the latch body receives an external force, the latch body may move in a direction toward the bracket and the biasing assembly may absorb some of the external force. The latch may be used with other latches coupled to a seat frame. In such case, the latch may absorb variations in alignment between the latches and a vehicle (e.g., a vehicle frame or the like) to which the latches are coupled.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Spatial and functional relationships between members are described herein using various terms, including "connected," "engaged," "coupled," "adjacent," "proximate," "next to," "on top of," "above," "below," "positioned," and "disposed." Unless explicitly described as being "direct," when a relationship between first and second members is described in the above disclosure, that relationship can be a direct relationship where no other intervening members are present between the first and second members, but can also be an indirect relationship where one or more intervening members are present (either spatially or functionally) between the first and second members While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A latch for a vehicle seat, comprising:
   a bracket having a plate defining a pivot point and a slot;
   a latch body pivotably coupled to the bracket at the pivot point and movably coupled to the bracket at the slot such that the latch body pivots about the pivot point between a latched position and a variation absorbing position, and the latch body having a supporting shaft slidably supported by the plate at the slot; and
   a biasing assembly comprising a first end hooked to the plate, a second end contacting the supporting shaft, and a helical portion between the first and second ends and disposed around the pivot point, the biasing assembly biasing the latch body toward the latched position.

2. The latch of claim 1, wherein the latch body includes a retention finger rotatably coupled to the supporting shaft.

3. The latch of claim 2, wherein the retention finger engages with a at least a portion of a vehicle frame.

4. A latch system for a vehicle seat, comprising:
   a latch comprising:
   a bracket having a plate defining a pivot point and a slot;
   a latch body pivotably coupled to the bracket at the pivot point and movably coupled to the bracket at the slot such that the latch body pivots about the pivot point between a latched position and a variation absorbing position, and the latch body having a supporting shaft slidably supported by the plate at the slot; and
   a biasing assembly comprising a first end hooked to the plate, a second end contacting the supporting shaft, and a helical portion between the first end and the second end and disposed around the pivot point, the biasing assembly biasing the latch body toward the latched position; and
   a striker configured to engage with the latch.

5. The latch system of claim 4, wherein the latch body includes a retention finger rotatably coupled to the supporting shaft.

6. The latch system, of claim 5, wherein the retention finger engages with the striker.

7. A vehicle seat, comprising:
   a seat frame;
   a first latch coupled to the seat frame including:
   a bracket having a plate defining a pivot point and a slot;
   a latch body pivotably coupled to the bracket at the pivot point and movably coupled to the bracket at the slot such that the latch body pivots about the pivot point between a latched position and a variation absorbing position, and the latch body having a supporting shaft slidably supported by the plate at the slot; and
   a biasing assembly comprising a first end hooked to the plate, a second end contacting the supporting shaft, and a helical portion between the first and second ends and disposed around the pivot point, the biasing assembly biasing the latch body toward the latched position.

8. The vehicle seat of claim 7, further comprising:
   a second latch coupled to the seat frame, the second latch including:
   a second bracket having a second plate defining a second coupling point; and
   a second latch body coupled to the second plate at the second coupling point,
   wherein the first latch is disposed on an outboard side of the seat frame, and the second latch is disposed on an inboard side of the seat frame.

9. The vehicle seat of claim 7, further comprising:
   a second latch coupled to the seat frame, the second latch including:
   a second bracket having a second plate defining a second coupling point; and
   a second latch body coupled to the second plate at the second coupling point,
   wherein the first latch is disposed on an inboard side of the seat frame, and the second latch is disposed on an outboard side of the seat frame.

* * * * *